United States Patent
Miller et al.

(10) Patent No.: US 9,524,033 B2
(45) Date of Patent: Dec. 20, 2016

(54) WIRELESS KEYBOARD

(71) Applicant: International Business Machines Corporation, Armonk, NY (US)

(72) Inventors: Grant D. Miller, Arvada, CO (US); Nader M. Nassar, Yorktown Heights, NY (US); Dennis M. Newns, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 263 days.

(21) Appl. No.: 13/790,010

(22) Filed: Mar. 8, 2013

(65) Prior Publication Data

US 2014/0253452 A1    Sep. 11, 2014

(51) Int. Cl.
*G06F 3/023*    (2006.01)
*G06F 3/02*    (2006.01)
*H01H 13/70*    (2006.01)

(52) U.S. Cl.
CPC ........... *G06F 3/0202* (2013.01); *G06F 3/0231* (2013.01); *H01H 13/70* (2013.01); *H01H 2239/076* (2013.01); *H01H 2300/032* (2013.01); *Y02B 90/224* (2013.01); *Y04S 20/14* (2013.01)

(58) Field of Classification Search
None
See application file for complete search history.

(56) References Cited

U.S. PATENT DOCUMENTS

| | | | |
|---|---|---|---|
| 4,510,484 A | | 4/1985 | Snyder |
| 5,528,222 A | | 6/1996 | Moskowitz et al. |
| 5,911,529 A | * | 6/1999 | Crisan ..................... 400/472 |
| 6,133,833 A | * | 10/2000 | Sidlauskas et al. ....... 340/572.1 |
| 6,828,902 B2 | | 12/2004 | Casden |
| 7,006,014 B1 | * | 2/2006 | Henty .............. 341/22 |
| 7,021,535 B2 | * | 4/2006 | Overhultz et al. ............ 235/382 |
| 7,157,651 B2 | | 1/2007 | Rix et al. |
| 7,315,908 B2 | * | 1/2008 | Anderson ............ 710/62 |
| 7,535,424 B2 | | 5/2009 | Henty |
| 7,570,166 B2 | * | 8/2009 | Alden et al. .......... 340/572.1 |
| 7,822,944 B2 | * | 10/2010 | Schuessler ............ 711/217 |
| 8,089,376 B2 | | 1/2012 | Oberle |
| 8,288,923 B2 | | 10/2012 | Vaidyanathan |
| 8,786,470 B2 | * | 7/2014 | Yang ................ 341/26 |
| 2003/0139155 A1 | * | 7/2003 | Sakai ............... 455/127 |
| 2004/0036626 A1 | * | 2/2004 | Chan ............... A01K 11/006 340/870.17 |
| 2004/0233172 A1 | * | 11/2004 | Schneider et al. ............ 345/168 |
| 2005/0237295 A1 | * | 10/2005 | Anderson ............ 345/156 |

(Continued)

OTHER PUBLICATIONS

Paradiso et al., "Energy Scavenging for Mobile and Wireless Electronics", IEEE Pervasive Computing, vol. 4, Issue 1, Jan.-Mar. 2005, pp. 18-27.

*Primary Examiner* — Antonio Xavier

(74) *Attorney, Agent, or Firm* — Cantor Colburn LLP; Vazken Alexanian

(57) ABSTRACT

Embodiments include a wireless keyboard having a plurality of keys and a plurality of radio frequency identification (RFID) tags, wherein each of the plurality of RFID tags are coupled to one of the plurality of keys. Each of the RFID tags are configured to transmit a signal when one of the plurality of keys coupled to RFID tag is pressed.

10 Claims, 5 Drawing Sheets

(56) References Cited

U.S. PATENT DOCUMENTS

| | | | |
|---|---|---|---|
| 2006/0145893 A1* | 7/2006 | Hassett | G07B 15/063 340/928 |
| 2007/0040655 A1 | 2/2007 | Lee et al. | |
| 2007/0057792 A1* | 3/2007 | Alden | 340/572.1 |
| 2007/0200778 A1* | 8/2007 | Henty | 343/702 |
| 2007/0285248 A1* | 12/2007 | Hamel et al. | 340/572.1 |
| 2008/0191875 A1* | 8/2008 | Park | 340/572.1 |
| 2008/0197981 A1* | 8/2008 | Stewart | G06K 19/0723 340/10.3 |
| 2009/0108992 A1* | 4/2009 | Shafer | H04L 69/08 340/10.1 |
| 2009/0160605 A1* | 6/2009 | Roemerman et al. | 340/5.8 |
| 2009/0276347 A1* | 11/2009 | Kargman | 705/35 |
| 2010/0147601 A1* | 6/2010 | Choi et al. | 178/18.03 |
| 2010/0277320 A1* | 11/2010 | Gold | 340/572.1 |
| 2011/0131083 A1* | 6/2011 | Redmann | B60L 11/1816 705/13 |
| 2011/0258130 A1* | 10/2011 | Grabiner | G06Q 10/087 705/317 |
| 2012/0028680 A1* | 2/2012 | Breed | 455/556.1 |
| 2012/0056498 A1* | 3/2012 | Zhu | 307/154 |
| 2012/0098439 A1* | 4/2012 | Recker et al. | 315/152 |
| 2012/0318863 A1* | 12/2012 | Kim | G06K 19/0704 235/380 |
| 2013/0057476 A1* | 3/2013 | Tseng | 345/168 |
| 2014/0091857 A1* | 4/2014 | Bernstein | 327/517 |

* cited by examiner

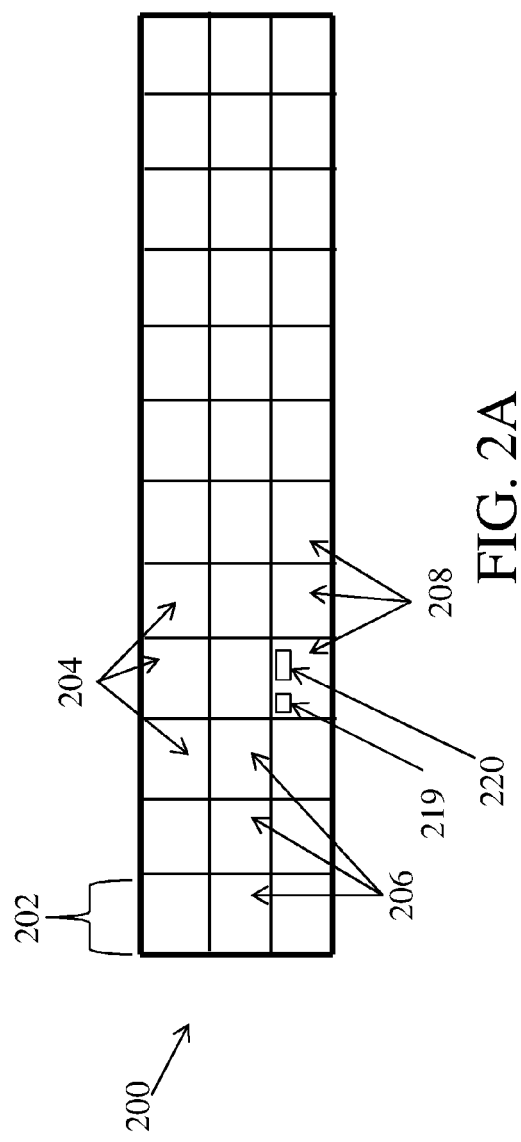
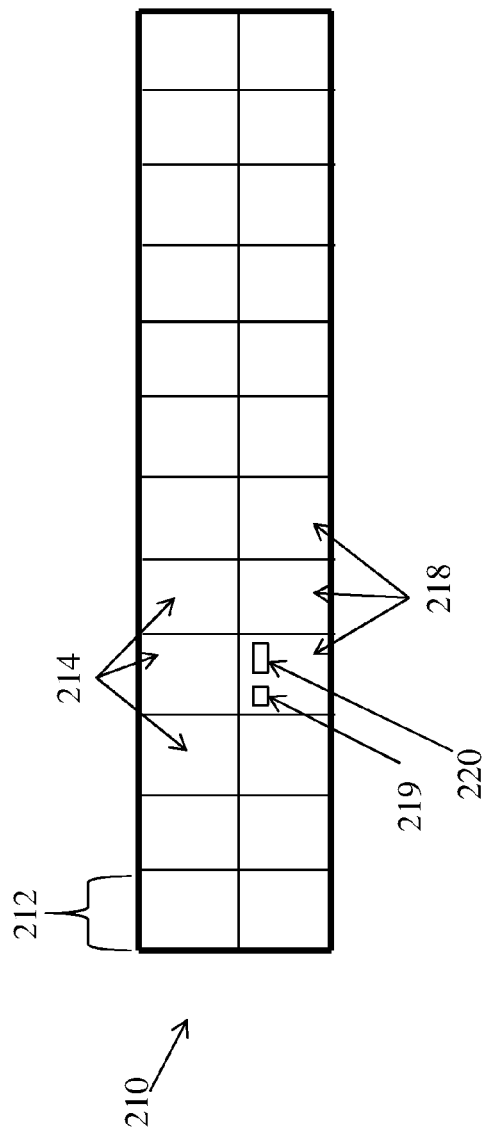

WIRELESS KEYBOARD

BACKGROUND

Exemplary embodiments relate to wireless keyboards, and more specifically, to systems for providing a wireless keyboard utilizing radio frequency identification (RFID).

Wireless keyboards have become popular for use with mobile devices, tablet computers, and computers. Wireless keyboards typically use Bluetooth® technology to transmit keystroke information to a receiver. Bluetooth® is a registered trademark of Bluetooth SIG. Although the power requirements required for Bluetooth transmission by the keyboards are small, a power source is still required for the wireless keyboards. Power sources used in currently available wireless keyboards include batteries or solar panels. One drawback of using batteries is that they occasionally have to be replaced. Similarly, a drawback of solar panels is that they only provide enough power when there is sufficient light available.

SUMMARY

According to an exemplary embodiment, a wireless keyboard includes a plurality of keys and a plurality of radio frequency identification (RFID) tags, wherein each of the plurality of RFID tags are coupled to one of the plurality of keys. Each of the RFID tags are configured to transmit a signal when one of the plurality of keys coupled to the RFID tag is pressed.

According to another exemplary embodiment, a wireless keyboard includes a plurality of keys. Each of the plurality keys includes a radio frequency identification (RFID) tag and a piezoelectric material configured to provide power to the RFID tag, the piezoelectric material disposed beneath a cover of the key. The RFID tag is configured to transmit a signal when the key coupled to the RFID tag is pressed.

According to a further exemplary embodiment, a wireless keyboard system includes a wireless keyboard and a computing device. The wireless keyboard includes a plurality of keys and a plurality of radio frequency identification (RFID) tags, wherein each of the plurality of RFID tags are coupled to one of the plurality of keys. Each of the RFID tags are configured to transmit a signal when the key coupled to the RFID tag is pressed. The computing device includes an RFID reader configured to receive the signal from each of the plurality of RFID tags.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

FIG. 2A is a cross-sectional view of a wireless keyboard according to one embodiment.

FIG. 2B is a cross-sectional view of a wireless keyboard according to another embodiment.

DETAILED DESCRIPTION

Exemplary embodiments of this disclosure include a wireless keyboard having radio frequency identification (RFID) tags coupled to each key of the wireless keyboard. The wireless keyboard is used with a computing device that includes, or is connected to, an RFID reader. In one embodiment, the RFID tags are active tags that are powered by a force exerted on a piezoelectric material that is disposed beneath each key of the keyboard. In another embodiment, the RFID tags are passive tags that receive power from the RFID reader disposed in the computing device used with the wireless keyboard.

In exemplary embodiments, by utilizing separate RFID tags for each key of the wireless keyboards the design of the wireless keyboard can be simplified by removing the wiring between the keys. In addition, the design of the wireless keyboard can be made lighter and simpler because the keyboard no longer requires a battery or other power source.

Figure 1:
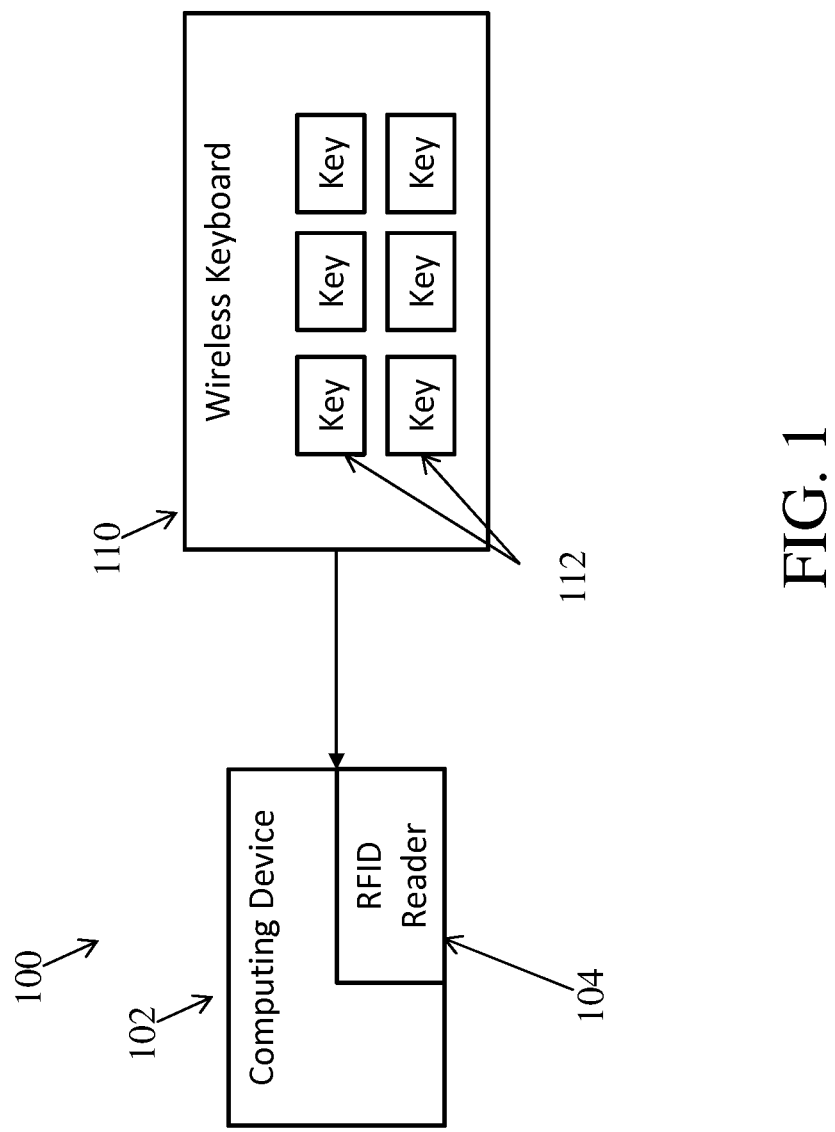
FIG. 1 is a block diagram of system for using a wireless keyboard in accordance with an exemplary embodiment.

Referring now to FIG. 1, a block diagram of wireless keyboard system 100 in accordance with an exemplary embodiment is shown. As shown, the wireless keyboard system 100 includes a computing device 102 that includes an RFID reader 104. In exemplary embodiments, the computing device 102 may include, but is not limited to, a personal computer, a laptop computer, a tablet device, a smartphone, a television, or the like. In exemplary embodiments, the RFID reader 104 may be integrated into the computing device 102 or the RFID reader 104 may be an external device connected to the computing device, for example via a USB port. The wireless keyboard system 100 also includes a wireless keyboard 110 having a plurality of keys 112, wherein each key includes an RFID tag (not shown). In exemplary embodiments, the wireless keyboard 110 may include, but is not limited to, a QWERTY keyboard, a remote control, or the like.

Referring now to FIG. 2A, a wireless keyboard 200 according to one embodiment is shown. As illustrated, the wireless keyboard 200 includes a plurality of keys 202. Each of the plurality of keys 202 includes a cover 204 disposed on top of a piezoelectric material 206, which is coupled to an RFID tag 208. In exemplary embodiments, the piezoelectric material 206 may include, but is not limited to, PMN-PT $(Pb[Mg_{1/3}Nb_{2/3}]_{(1-y)}O_3\text{—}PbTi_yO_3)$ and PZT $(Pb[Zr_xTi_{1-x}]O_3)$. In exemplary embodiments, the cover 204 may include a graphical representation corresponding to the key, such as a letter or a number. In other embodiments, the shape of the cover 204 may be indicative of the function of the corresponding to the key, such as an arrow or the like. During the use of the wireless keyboard 200, as the cover 204 of the key 202 is pressed, the piezoelectric material 206 disposed underneath the cover 204 is compressed. As a result, the piezoelectric material 206 generates an electrical current. The electrical current generated by the piezoelectric material 206 is supplied to the RFID tag 208 and the RFID tag 208 transmits a signal in response to receiving the electrical current. In exemplary embodiments, the signal transmitted by the RFID tag 208 includes a device identification portion 219 configured to identify the wireless keyboard 200 and a key identification portion 220 configured to identify the key 202 that was pressed. For example, the signal may be a 32-bit signal having an 8-bit device identification portion 219 configured to identify the wireless keyboard 200 and having a 24-bit key identification portion 220 configured to identify each key.

Referring now to FIG. 2B, a wireless keyboard 210 according to another embodiment is shown. As illustrated, the wireless keyboard 210 includes a plurality of keys 212. Each of the plurality of keys 212 includes a cover 214 disposed on top of an RFID tag 218. In exemplary embodiments, the cover 214 may include a graphical representation corresponding to the key, such as a letter or a number. In other embodiments, the shape of the cover 214 may be indicative of the function of the corresponding to the key, such as an arrow or the like. In exemplary embodiments, the RFID tags 218 are passive RFID tags configured to receive power from the RFID reader of the computing device. During the use of the wireless keyboard 210, as the cover 214 of the key 212 is pressed, the cover 214 contacts a portion of the RFID tag 218 causing the RFID tag 218 to transmit a signal. In exemplary embodiments, the signal transmitted by the RFID tag 218 includes a device identification portion 219 configured to identify the wireless keyboard 210 and a key identification portion 220 configured to identify the key 212 that was pressed.

Figures 3A, 3B:
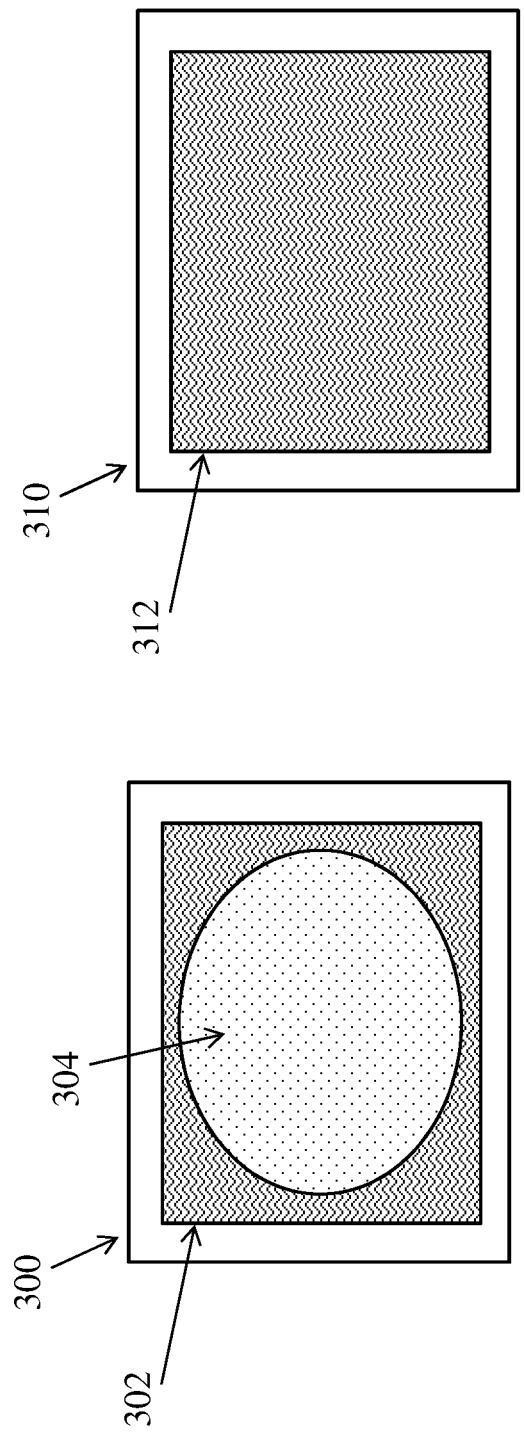
FIG. 3A is a top view a key of a wireless keyboard according to one embodiment.
FIG. 3B is a top view a key of a wireless keyboard according to another embodiment.

Referring now to FIG. 3A, a key of a wireless keyboard according to one embodiment is shown. As illustrated, the key includes a cover 300, a RFID tag 302 and a piezoelectric material 304. In exemplary embodiments, the cover 300 is disposed on top of the piezoelectric material 304, such that when the key is pressed the piezoelectric material 304 is compressed and generates an electrical current. In exemplary embodiments, the RFID tag 302 is an active RFID tag that is configured to receive the electrical current required to transmit a signal indicating that the key was pressed from the piezoelectric material 304.

Referring now to FIG. 3B, a key 310 of a wireless keyboard according to another embodiment is shown. As illustrated, the key includes a cover 310 and a RFID tag 312. In exemplary embodiments, the cover 310 is disposed on top of the RFID tag 312, such that when the key is pressed the cover 310 contacts the RFID tag 312 and causes the RFID tag 312 to transmit a signal indicating that the key was pressed. In exemplary embodiments, the RFID tag 312 is an active RFID tag that is configured to receive the electrical power from the RFID reader of the computing device. In exemplary embodiments, the cover 210 is configured to contact a portion of the RFID tag 312 such that a circuit is closed on the RFID tag 312 that causes the RFID tag 312 to transmit the signal.

In exemplary embodiments, the piezoelectric material may be configured to provide around $10^{-9}$ J per keystroke. In one embodiment, an RFID tag may require about 10 uW to transmit a signal. Accordingly, a piezoelectric material configured to provide around $10^{-9}$ J per keystroke can provide enough power for $10^{-4}$ sec, which is sufficient to transmit 32 bits in about 100 cycles, at a frequency of at least 1 MHz.

Figure 4A:
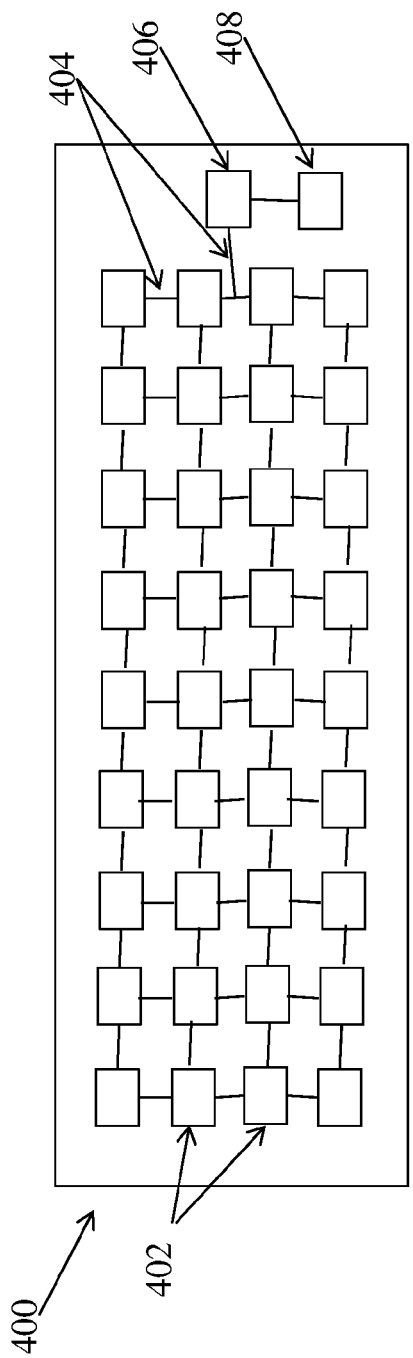
FIG. 4A is a block diagram of a traditional wireless keyboard.

Referring now to FIG. 4A, a block diagram of a traditional wireless keyboard 400 is shown. As illustrated, the traditional wireless keyboard 400 includes a plurality of keys 402 that are connected by circuitry 404. In addition the traditional wireless keyboard 400 includes a transmitter 406 and a battery 408 configured to provide power to the transmitter.

Figure 4B:
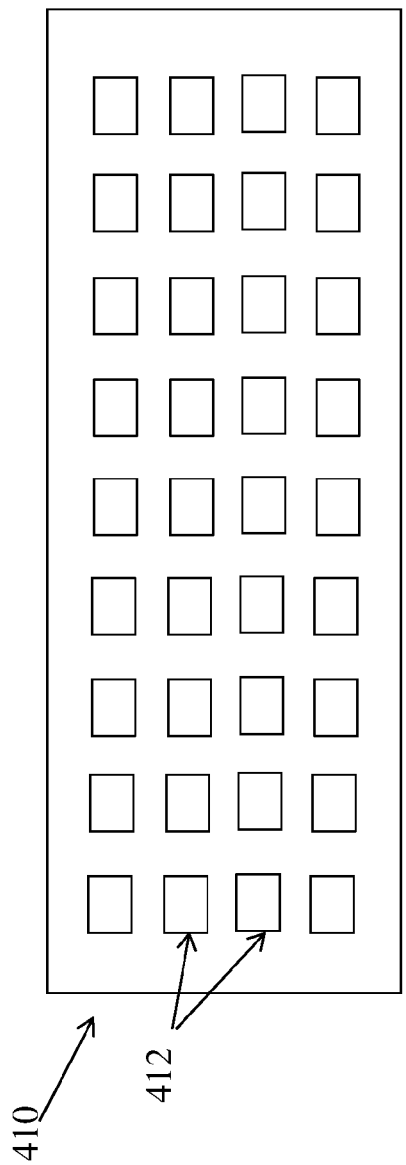
FIG. 4B is a block diagram of a wireless keyboard according to one embodiment.

Referring now to FIG. 4B, a block diagram of a wireless keyboard 410 according to one embodiment is shown. As shown, the wireless keyboard 410 includes a plurality of keys 412 that each include an RFID tag (not shown). The wireless keyboard 410 does not include a battery, transmitter or circuitry connecting the plurality of keys 412. In exemplary embodiments, the layout of the wireless keyboard 410 reduces the wiring and components needed inside the keyboard and can result in a reduction in the cost of manufacturing the wireless keyboard 410.

In exemplary embodiments, the RFID reader of the computing device is configured to receive the signals transmitted by the wireless keyboard. The computing device includes software that can be used to assign a corresponding key stroke with each signal. In addition, the computing device may be configured to allow flexibility for redefining the keys in software.

In exemplary embodiments, the RFID tags of the wireless keyboard may be configured to transmit in at a very low frequency (VLF), for example in the range of 3 kHz to 30 kHz. In one embodiment, the wireless keyboard may have an effective transmission range, a range in which it is capable of communicating with the RFID reader, of between three and five feet. A frequency greater than one megahertz generally required because the key pulse can only activate the RFID tag for a short time and can not generate an amount of power required for lower frequencies.

Figure 5:
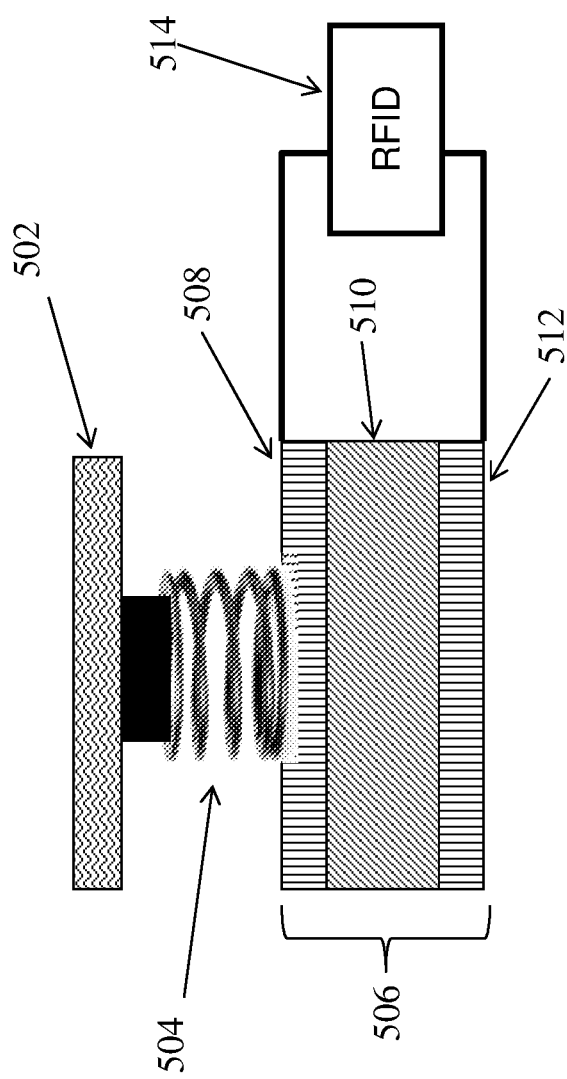
FIG. 5 is a schematic diagram of a key of a wireless keyboard according to one embodiment.

Referring now to FIG. 5, a schematic diagram of a key of a wireless keyboard according to one embodiment. As illustrated, a key 502 is disposed on top of, and may be connected to, a spring 504. The spring 504 is disposed on top of a piezoelectric device 506, which may include a top contact 508, a bottom contact 512 and a piezoelectric material 510 disposed in-between the top contact 508 and the bottom contact 512. In exemplary embodiments, the top contact 508 and bottom contact 512 are electrodes that are connected to an RFID chip 514. During use of the wireless keyboard, as the key 502 is pressed, a force is exerted on the piezoelectric device 506 that causes the piezoelectric material 510 to compress. The compression of the piezoelectric material 510 causes a current to flow to the RFID chip 514, thereby providing the power needed by the RFID chip to transmit a signal. After the key is depressed, the spring 504 is configured to return the key 502 to its original position.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A wireless keyboard comprising:
a plurality of keys; and
a plurality of radio frequency identification (RFID) tags,
wherein each of the plurality of RFID tags is coupled to only one of the plurality of keys,
wherein each of the RFID tags is configured to transmit a wireless signal when the one of the plurality of keys coupled to the RFID tag is pressed,
wherein each of the RFID tags is configured to provide $10^{-9}$ J of power per keystroke for $10^{-4}$ sec when pressed,
wherein the wireless signal includes a device identification portion comprising a unique identification number of the wireless keyboard and a key identification portion comprising a unique identification number of one of the plurality of keys coupled to the RFID tag, and
wherein the device identification portion and the key identification portion are separate fields and wherein the device identification portion includes a different number of bits than the key identification portion; and wherein each of the RFID tags is configured to transmit the wireless signal at a frequency range of 3 kHz to 30 kHz.

2. The wireless keyboard of claim 1, further comprising a plurality of piezoelectric materials coupled to the plurality of RFID tags and disposed beneath a cover of each of the plurality of keys, wherein each of the plurality of piezoelectric materials are configured to provide power to each of the plurality of the RFID tags.

3. The wireless keyboard of claim 1, wherein each of the plurality of RFID tags comprises a passive RFID tag configured to receive power from an RFID reader.

4. The wireless keyboard of claim 1, wherein the shape of a cover is a shape of an arrow.

5. A wireless keyboard comprising:
a plurality of keys, each of the plurality keys comprising:
a radio frequency identification (RFID) tag; and
a piezoelectric material configured to provide power to the RFID tag, the piezoelectric material disposed beneath a cover of the key;
wherein the RFID tag is configured to transmit a signal when the one of the plurality of keys coupled to the RFID tag is pressed,
wherein the RFID tags is configured to provide $10^{-9}$ J of power per keystroke for $10^{-4}$ sec when pressed,
wherein the signal transmitted comprises a device identification portion comprising a unique identification number of the wireless keyboard and a key identification portion comprising a unique identification number of one of the plurality of keys coupled to the RFID tag,
wherein the device identification portion and the key identification portion are separate fields and wherein the device identification portion includes a different number of bits than the key identification portion; and
wherein the RFID tag is configured to transmit the signal at a frequency range of 3 kHz to 30 kHz.

6. The wireless keyboard of claim 5, wherein the shape of the cover is a shape of an arrow.

7. A wireless keyboard system comprising:
a wireless keyboard comprising:
a plurality of keys; and
a plurality of radio frequency identification (RFID) tags,
wherein each of the plurality of RFID tags is coupled to only one of the plurality of keys,
wherein each of the RFID tags are configured to transmit a signal when the key coupled to RFID tag is pressed,
wherein the RFID tags is configured to provide $10^{-9}$ J of power per keystroke for $10^{-4}$ sec when pressed,
wherein the signal transmitted comprises a device identification portion comprising a unique identification number of the wireless keyboard and a key identification portion comprising a unique identification number of one of the plurality of keys coupled to the RFID tag,
wherein the device identification portion and the key identification portion are separate fields and wherein the device identification portion includes a different number of bits than the key identification portion; and
wherein each of the RFID tags are configured to transmit the signal at a frequency range of 3 kHz to 30 kHz; and
a computing device comprising an RFID reader configured to receive the signal from each of the plurality of RFID tags.

8. The wireless keyboard system of claim 7, wherein the wireless keyboard further comprises a plurality of piezoelectric materials coupled to the plurality of RFID tags and disposed beneath a cover of each of the plurality of keys, wherein each of the plurality of piezoelectric materials are configured to provide power to each of the plurality of the RFID tags.

9. The wireless keyboard system of claim 7, wherein each of the plurality of RFID tags comprises a passive RFID tag configured to receive power from the RFID reader of the computing device.

10. The wireless keyboard system of claim 7, wherein the shape of a cover is a shape of an arrow.

* * * * *